US009227353B2

(12) United States Patent
Williams

(10) Patent No.: US 9,227,353 B2
(45) Date of Patent: Jan. 5, 2016

(54) MOLDING APPARATUS AND METHOD FOR OPERATING SAME

(71) Applicant: Charles George Williams, Spring Hill, FL (US)

(72) Inventor: Charles George Williams, Spring Hill, FL (US)

(73) Assignee: Solar Hydronics Corporation, Odessa, FL (US)

( * ) Notice: Subject to any disclaimer, the term of this patent is extended or adjusted under 35 U.S.C. 154(b) by 435 days.

(21) Appl. No.: 13/671,924

(22) Filed: Nov. 8, 2012

(65) Prior Publication Data

US 2014/0124974 A1        May 8, 2014

(51) Int. Cl.
| | |
|---|---|
| *B29C 47/08* | (2006.01) |
| *B29C 47/00* | (2006.01) |
| *B29C 45/14* | (2006.01) |
| *B29C 33/12* | (2006.01) |

(52) U.S. Cl.
CPC ............ *B29C 47/004* (2013.01); *B29C 33/12* (2013.01); *B29C 45/14065* (2013.01); *B29C 45/14614* (2013.01); *B29C 45/14639* (2013.01); *B29C 47/0028* (2013.01)

(58) Field of Classification Search
CPC ............ B29C 47/004; B29C 45/14065; B29C 45/14639; B29C 33/12; B29C 45/14614; B29C 47/0028
See application file for complete search history.

(56) References Cited

U.S. PATENT DOCUMENTS

| | | | | |
|---|---|---|---|---|
| 353,681 | A * | 12/1886 | Hurlburt | 425/467 |
| 2,411,398 | A * | 11/1946 | Wallace | 264/159 |
| 2,616,126 | A * | 11/1952 | Merck et al. | 425/97 |
| 2,804,284 | A * | 8/1957 | Otten | 165/166 |
| 2,864,130 | A * | 12/1958 | Beare | 29/530 |
| 2,908,037 | A * | 10/1959 | Harkenrider | 425/192 R |
| 3,274,315 | A * | 9/1966 | Yuzo | 264/563 |
| 3,438,432 | A * | 4/1969 | Bernath et al. | 165/138 |
| 3,643,805 | A * | 2/1972 | Hoffman | 210/321.87 |
| 3,648,768 | A * | 3/1972 | Scholl | 165/171 |
| 3,792,951 | A * | 2/1974 | Meyers | 425/326.1 |
| 3,841,938 | A * | 10/1974 | Grosse-Holling et al. | 156/293 |
| 3,961,010 | A * | 6/1976 | Holmes | 264/221 |
| 4,043,015 | A * | 8/1977 | Hickman et al. | 165/173 |
| 4,060,070 | A * | 11/1977 | Harter | 126/660 |
| 4,169,366 | A * | 10/1979 | Ames | 72/269 |
| 4,176,654 | A * | 12/1979 | Zinn et al. | 126/665 |
| 4,207,596 | A * | 6/1980 | Pires | 348/598 |
| 4,296,539 | A * | 10/1981 | Asami | 29/890.07 |
| 4,312,687 | A * | 1/1982 | Sigworth, Jr. | 156/245 |
| 4,352,772 | A * | 10/1982 | Bezner | 264/229 |
| 4,371,326 | A * | 2/1983 | McAlister | 425/71 |
| 4,414,960 | A * | 11/1983 | Wasserman | 126/626 |
| 4,655,987 | A * | 4/1987 | Zertuche | 264/563 |
| 4,740,344 | A * | 4/1988 | Wollbeck et al. | 264/248 |
| 4,790,372 | A * | 12/1988 | Gemeinhardt et al. | 165/173 |
| 5,248,171 | A * | 9/1993 | Briet | 285/133.3 |
| 5,266,262 | A * | 11/1993 | Narayama et al. | 264/513 |
| 5,356,587 | A * | 10/1994 | Mitsui et al. | 264/263 |

(Continued)

*Primary Examiner* — Yogendra Gupta
*Assistant Examiner* — Emmanuel S Luk
(74) *Attorney, Agent, or Firm* — Jason T. Daniel, Esq.; Daniel Law Offices, P.A.

(57) ABSTRACT

A removable mold apparatus that forms a portion of the inner surface contour of an elongated hollow over molded polymeric solar collector distribution manifold and its preferred method of leveraged use that integrates select raw material components and process methods to enhance both manufacturing efficiency and hermetic enjoinment durability, most especially when over molding onto connectively spaced tube absorber constructions.

8 Claims, 4 Drawing Sheets

(56) References Cited

U.S. PATENT DOCUMENTS

| | | | | |
|---|---|---|---|---|
| 5,411,079 A * | 5/1995 | Sasaki et al. | | 165/151 |
| 5,445,782 A * | 8/1995 | Sadr | | 264/513 |
| 5,469,915 A * | 11/1995 | Cesaroni | | 165/171 |
| 5,567,493 A * | 10/1996 | Imai et al. | | 428/36.9 |
| 5,733,491 A * | 3/1998 | Grosset et al. | | 264/172.1 |
| 5,807,590 A * | 9/1998 | Ishikawa et al. | | 425/190 |
| 5,865,244 A * | 2/1999 | Moser | | 165/173 |
| 6,742,576 B2 * | 6/2004 | Bergevin | | 165/133 |
| 6,918,435 B2 * | 7/2005 | Dwyer | | 165/171 |
| 6,997,248 B2 * | 2/2006 | Shabtay et al. | | 165/153 |
| 7,011,149 B2 * | 3/2006 | Fujita et al. | | 165/173 |
| 7,222,664 B2 * | 5/2007 | Bouzon et al. | | 165/165 |
| 7,955,546 B2 * | 6/2011 | Yoshioka et al. | | 264/328.12 |
| 8,261,567 B2 * | 9/2012 | Zangari et al. | | 62/255 |
| 8,696,853 B2 * | 4/2014 | Dehennau et al. | | 156/244.11 |
| 2002/0162222 A1 * | 11/2002 | Williams et al. | | 29/890.03 |
| 2005/0051314 A1 * | 3/2005 | Heier | | 165/173 |
| 2006/0091266 A1 * | 5/2006 | Leiser et al. | | 248/68.1 |
| 2007/0006545 A1 * | 1/2007 | Johnston | | 52/745.09 |
| 2007/0176318 A1 * | 8/2007 | Saito | | 264/176.1 |
| 2008/0010924 A1 * | 1/2008 | Pietruczynik et al. | | 52/309.1 |
| 2009/0220785 A1 * | 9/2009 | Monro et al. | | 428/397 |
| 2010/0209546 A1 * | 8/2010 | Hayashi et al. | | 425/464 |
| 2013/0186388 A1 * | 7/2013 | Mills | | 126/663 |
| 2015/0083325 A1 * | 3/2015 | Kitamura et al. | | 156/325 |
| 2015/0147522 A1 * | 5/2015 | Erhard et al. | | 428/131 |

* cited by examiner

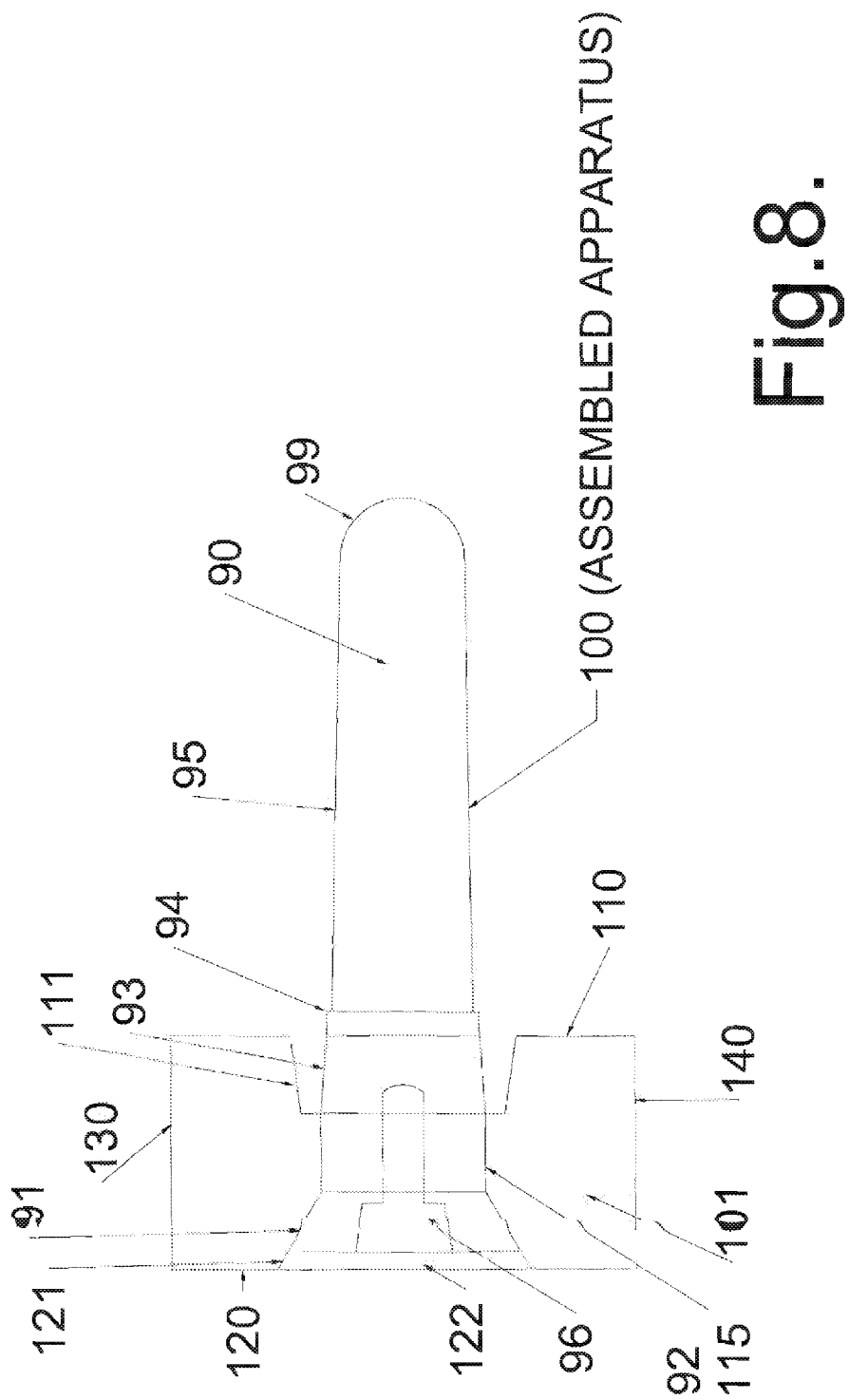

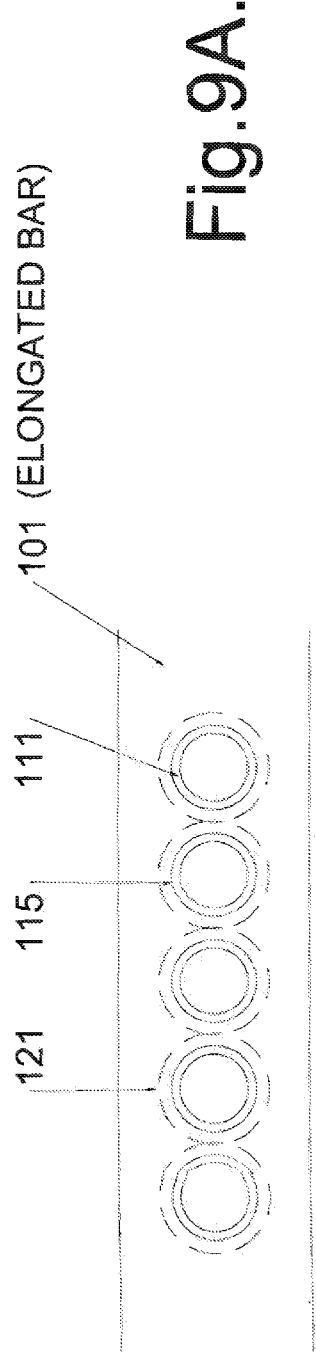
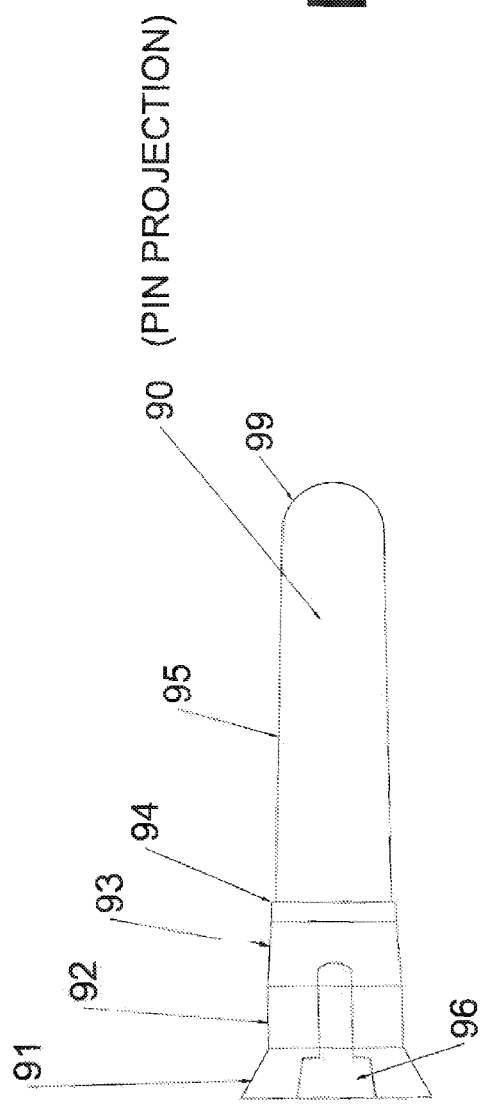

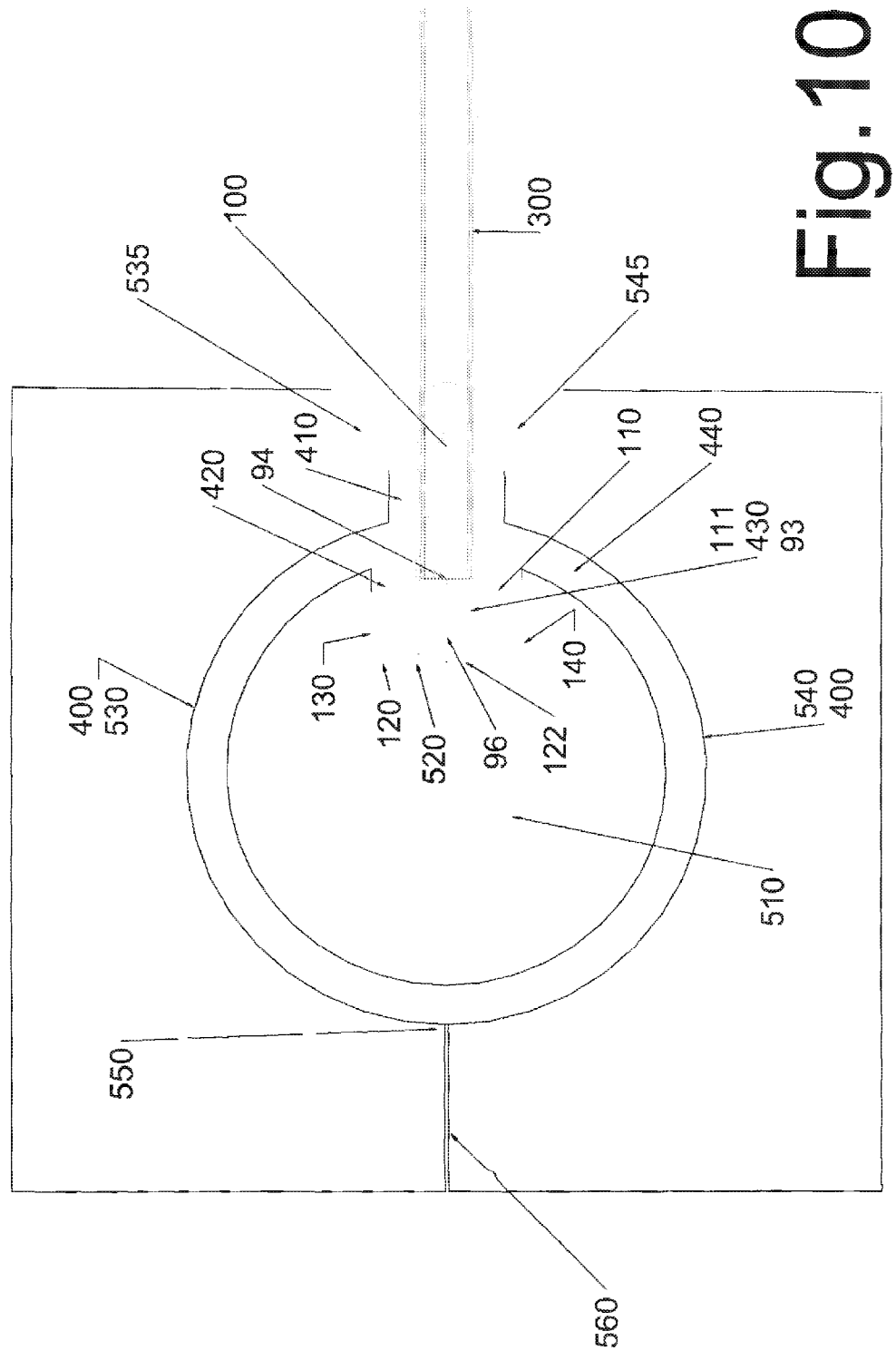

MOLDING APPARATUS AND METHOD FOR OPERATING SAME

TECHNICAL FIELD

Polymeric solar collectors have been manufactured and marketed over the past four decades using a diversity of manufacturing methods, materials, and design elements. By way of basic introduction, these products typically are comprised of a multiplicity of hollow conduits to uniformly segment an overall flow rate of liquid, typically mostly comprising water, in a manner conducive to being effectively heated by sunlight. Polymeric construction inherently provides very powerful benefits most importantly as relating to chemical resistance, weight reduction, and manufacturability.

Although polymeric solar collectors have continued to be overwhelmingly used for heating swimming pools, it is anticipated that the ongoing advancement of all relevant technology will someday allow them to be likewise overwhelmingly used in the more need driven application of home hot water heating. Accordingly, the present disclosure is directed towards the ongoing enhancement of the manufacturing efficiency and durability of polymeric solar collectors.

BACKGROUND

The statements in this section merely provide background information related to the present disclosure and may not constitute prior art.

Conventional polymeric solar collectors typically include two manifolds that are each hermetically enjoined to each end of an absorber construction wherein the absorber construction is comprised of a great multiplicity of hollow conduits through which water is uniformly passed from one enjoined manifold to the other. The manufacturing of these solar collectors utilizes a variety of thermoplastic melt forming and enjoining methods that are in practice leveraged to significantly varying degrees in the quest for overall manufactured product value. Accordingly, polymeric forming manufacturability through extrusion has utilized 3 basic forms of solar collector absorber component construction. They are in order of manufacturability from the least leveraged to the most leveraged: (1) a single conduit preferably round, (2) a profile consisting of two parallel sheets with a multiplicity of connected partitions, (3) a string of planar aligned conduits, preferably round, with connective webs between each conduit and an attachment means at the end of each string.

Conventional methods for cost effectively joining the extruded absorber constructions to the manifolds in order of the least leveraged to the most leveraged include, (1) plastic thermal fusion via hot platen or infrared fixture welding to a separately extruded manifold, and (2) injection molding the manifold directly over the separately extruded absorber construction.

The most preferred embodiment of this present invention is directed toward the most leveraged methods of extrusion absorber construction and manifold joining or more specifically the over molding of manifolds directly over mold cavity inserted connectively spaced tube substrates. It features a novel molding apparatus and the further use of polypropylene as the primary core material of overall construction, and further uses very specific material formulation and process methodology to most effectively leverage the overall benefits of the novel apparatus. This present invention represents a giant step forward to a field of art that has been relatively stale, as shown by a brief summary of representative patent documents provided herein for reference.

U.S. Pat. No. 4,352,772, to Bezner describes what amounts to a very generalized insert or over molding method and a more specific apparatus oriented method to make a polymeric thermoplastic manifold to absorber joint of a solar collector more specifically or heat exchanger more generally. The document describes a "stay with the mold absorber tube supporting projection means". All 3 of the previously mentioned extruded absorber embodiments are featured. Most particularly a connectively spaced tube absorber extrusion is featured in what as will here be revealed as a clearly non-viable embodiment as relating to the methods as disclosed. This as would be regarded as the most leveraged extrusion embodiment of the Bezner disclosure appears to limit its focus upon a concern that limited extrusion process accuracy, more specifically in the form of accumulated spacing error, must be compensated for to insure that the multiplicity of tubes will fit the extended uniform spacing of the very necessary supportive projections. This "elastic web" coping mechanism has been repeatedly shown to be unnecessary. It can be further shown that it is not even a viable manufacturing alternate. In particular, the very numerous overly sharp crevices within the outer shape contour of the extruded structure are exceedingly difficult to hermetically fill and fuse into during molding. It is of great significance that the ultimate assignee of the patent has over these past 3 decades has been manufacturing and marketing only the least leveraged extruded single tube absorber embodiment and not the "elastic web" coping mechanism.

Of additional practical significance is that the Bezner assignee has consistently over molded manifolds in only one foot wide sections. The pool heating market demands 4 foot wide solar collector constructions. To meet this demand the assignee has consistently built out 4 one foot wide completed sections fixture welded together in 6 places. The disclosure is totally silent as regarding the highly influential processing aspect of mold gating strategy. When one studies the product it becomes evident that it is molded through multiple gates that are located on the side of the manifold directly opposite the inserted absorber. This explains the one foot wide sections. It is known to this inventor that the manifold mold core will bend during injection more and more as the manifold width is progressively widened using such a mold gating strategy. This introduces undesirable manifold thickness eccentricity resulting in manifold warp and weakened manifold to absorber enjoinment. The true practical utility of the method as disclosed is arguably very limited to solar collector construction in accordance to its very particular and ongoing method of practice.

U.S. Pat. No. 6,787,116, to Williams et al. describes, essentially a "stay with the part separately molded polymeric insert" intended to provide a secondary seal in addition to the primary seal of the very general Bezner molded manifold over absorber method. The key patent eligibility aspect lies with the 4 sided hollowed out box like structure that is provided creating a perimeter around strings of inserted absorber tubes by means of a separately molded component having sufficiently thinned side walls to enable the heat delivered by the injected over molding material to overwhelmingly thermally melt and fuse with that separately molded insert.

Although adequate for their intended purposes, none of the above patent documents describe a primary header to absorber joint over molding process that employs a removable absorber tube support means. More particularly, there are inherent and unique benefits available with using connectively spaced tube mold cavity inserted substrates that can be more or less effectively integrated within the manufactured article relative to the extent to which the process methodology is developmentally leveraged. The assignee of this present invention has for many years been using such an apparatus with much room for significant improvement. In light of the above, it would be beneficial to introduce a novel removable absorber tube support means apparatus that is much more functionally developed than its foundational precursor, and is especially more functionally developed for molding manifolds over connectively spaced tube absorber extrusion constructions.

SUMMARY OF THE INVENTION

The present invention is directed to a unitarily removable molding apparatus having at least four elongated surfaces. One embodiment of the present invention can include first and second elongated surfaces having a plurality of coplanar aligned and spaced hollow pockets interposed there between, a plurality of coplanar aligned and spaced projections extending beyond the first surface, wherein at least one passage is provided between each descended surface of the hollow pockets to an elongated passage within or upon the second elongated surface, and a third elongated surface that is separated from a fourth elongated surface.

This summary is provided merely to introduce certain concepts and not to identify key or essential features of the claimed subject matter.

BRIEF DESCRIPTION OF THE DRAWINGS

Presently preferred embodiments are shown in the drawings. It should be appreciated, however, that the invention is not limited to the precise arrangements and instrumentalities shown.

FIG. 8 illustrates a first surface facing view of the unified assembly that comprises the unitarily removal apparatus of this invention.

FIG. 9A illustrates a first surface facing view of a portion of the elongated 4 sided bar component of the unitarily removable molding apparatus of this invention.

FIG. 9B illustrates a vent cut side view of one pin projection component of the unitarily removable molding apparatus of this invention.

FIG. 10 illustrates a cross sectional centerline end view cut of the pre-assembled unitarily removable molding apparatus as inserted into the absorber tube ends and a as loaded into the manifold core slot of a manifold over molding vertically clamping mold.

DETAILED DESCRIPTION OF THE INVENTION

Figure 1:
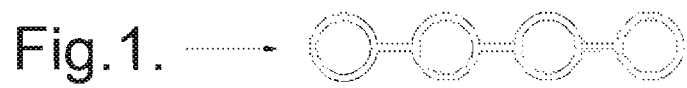
FIG. 1 illustrates an end view of a preferred connectively spaced tube absorber embodiment wherein all the tube connecting members lie along the common centerline of the coplanar string of tubes.

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

Identical reference numerals are used for like elements of the invention or elements of like function. For the sake of clarity, only those reference numerals are shown in the individual figures which are necessary for the description of the respective figure.

The inventive concepts disclosed herein relate to the design and method of use of a novel molding apparatus that functions as a cycle by cycle removable multi-purpose mold within a mold. It is loaded into an injection mold while inserted into an extruded structure and is unloaded from that injection mold while still inserted into that extruded structure after an additional structure is formed then solidified onto a portion of the outer surface of the extruded structure and into a portion of the novel apparatus. The novel apparatus is consequently mechanically extracted and repeatedly reused for ongoing mold cycles. The novel apparatus is particularly useful for hermetically enjoining elongated hollow polymeric fluid flow distributing manifolds over polymeric extruded structures having a multiplicity of spaced planar aligned hollow conduits, more generally used as heat exchangers, and more specifically used as solar collectors. It is more particularly useful with connectively spaced absorber extrusion structures, such as those as presented by FIG. 1 and FIG. 2A. It is most particularly useful with these connectively spaced tube extrusion structures that are over molded using a mold cavity gating strategy wherein the injection flow is perpendicular to the direction of extrusion or parallel with the elongated flow distributing manifold. The preferences of the FIG. 1 and FIG. 2A embodiments relative to the practical use of the inventive apparatus is most simply understood by way of contrast to the known alternatives.

Figure 3:
FIG. 3 illustrates an end view of a non-preferred connectively spaced tube absorber embodiment having a coping mechanism to compensate for excessive spacing variance accumulation.

FIG. 3 is a connectively spaced tube absorber embodiment that compensates for an imagined tube spacing variance accumulation of tolerance problem. It is the inventor's experience through many years of designing and running extrusion systems for connectively spaced tube structures that this is not at all something that need be done with a properly designed extrusion system. Furthermore, the coping mechanism here brings in a great plurality of deep and tight overly difficult to fill into crevices in the outer surface contour.

Figure 4:
FIG. 4 illustrates an end view of a less preferred separated tube absorber embodiment.

FIG. 4 is a less preferred separated tube embodiment that is believed by the inventor to be under leveraged as related to extrusion processing. It requires the addition of a plurality of a separately formed component to maintain the organization of the tubes along the length direction of the solar collector at regular intervals between the manifolds. Manufacturing cost efficiency pushes the use of relatively high die draw ratios for extrusion processing to achieve a cost tolerable extrusion pounds per hour processing rate. This in turn makes for an objectionable extrusion process induced intermolecular structure that is severely anisotropic, wherein the tubes are much more stress intolerant in the circumferential direction as opposed to the longitudinal direction. In practicality, this makes them more prone to splitting. When one understands the overall contributory destructive dynamic of the solar collector environment and the mechanism of the stabilization chemistry that fights to inhibit it, one can understand that the anisotropic intermolecular structure associated with this embodiment is not conducive to the product durability objectives of this invention.

Figure 5:
FIG. 5 illustrates an end view of a non-preferred connectively non spaced tube absorber embodiment.

FIG. 5 is a non-preferred connectively non-spaced tube embodiment made by thermally fusing single tubes together side by side. It brings in the anisotropic intermolecular structure deficiency as in the FIG. 4 embodiment as well as the difficult to fill into crevice deficiency as in the FIG. 3 embodiment. Furthermore, the side-by-side fusion area of the immediately adjacent tubes must in practicality involve more interfacial area that the precise tangent point, and imposes a weakness within that interface wherein an over molded manifold will never push into.

Figure 6:
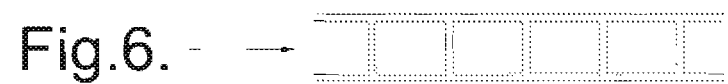
FIG. 6 illustrates an end view of a non-preferred uniformly thick partitioned non round absorber embodiment.

FIG. 6 is a non-preferred uniformly thick non round embodiment. The absorber flow tubes of a solar collector are desirably relatively thin for the obvious reason of cost control, if not for anything else. Material is and should be the biggest cost component of a solar collector. The design flaw is that internally pressurized conduits, particularly thin ones, and the relatively sharp corners here will have poor in-use-durability due to splitting. Another deficiency is that the overwhelming majority of the over molding surface area is flat, or more specifically the upper and lower surfaces lack the closely spaced and suitable contour depressions into which the over molding melt can penetrate into and thereby impede a stress induced lateral separation of the interfacial enjoinment area.

Figure 7:
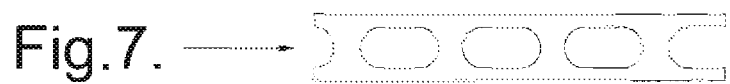
FIG. 7 illustrates an end view of a non-preferred non-uniformly thick non round absorber embodiment.

FIG. 7 is a non-preferred non-uniformly thick non-round embodiment that seeks to compensate for the thin and sharp corner deficiency of the FIG. 6 embodiment by introducing more material to the structure for a reinforcing purpose. Furthermore it likewise has the exact same outer surface deficiency of the FIG. 6 embodiment.

Figure 2:
FIG. 2 illustrates an end view of a connectively spaced tube absorber embodiment wherein all the tube connecting members lie along a common tangent line that is outside of the nearest outer tube surface common tangent line of the coplanar string of tubes.
Figure 2A:
FIG. 2A illustrates an end view of a preferred connectively spaced tube absorber embodiment wherein all the tube connecting members lie along a common tangent line that is outside the nearest outer tube surface common tangent line of the coplanar string of tubes.

As understood through the preceding discussion of the various absorber embodiment options the designs of FIG. 1 and FIG. 2A are preferable. The curved web of the design of FIG. 2A is intended to elevate the underside of the absorber flow tubes when used in a typical roof mounted solar collector. In that the connective tube members of FIG. 2 cannot be on the mold parting line as they can with the design of FIG. 1, it imposes an inherent gap between the absorber outer surface and one of the two mold shut off contour rails, whichever one depending upon the inserted orientation. This is because the mold cannot then part on the tube center and one of the mold halves will not release the part if it fully follows the tube contour beyond the tube center. This is overcome with the more preferred small radius convex/large radius concave/small radius convex connective tube element design of FIG. 2A, in that it significantly closes down the open gap to approximately ⅓ of what it would otherwise be with a single radius design as in FIG. 2. This is particularly important to enable much more favorable higher temperature and pressure molding conditions. Even more, it enables an enlarged radius on the scalloped surface contour, providing a more forgiving crevice to push the molten material into. This all provides a very significant enhancement to the hermetic enjoinment manufacturing efficiency and end product durability.

To finalize the absorber preference contrast, it is important to note that the inherent nature of the connective spaced tube designs of FIG. 1 and FIG. 2A, in that both can involve coplanar strings of many tubes requires that extrusion die draw ratios be keep extremely small. Because the number of tubes is greatly multiplied the resultant very small extrusion die gaps present no problem whatsoever to the extrusion pounds per hour pace. The linear speed of the extrusion can run well within the shear limiting die gap speed that is well known to those having ordinary skill in the art of thermoplastic extrusion. The limitation is so thoroughly overcome by the multiplication of the number of tubes in the single piece structure that the pounds per extrusion speed can far exceed that of the single tube construction with the most extreme draw ratios imaginable. Many with ordinary skill in the art might argue that the attainable wall thickness uniformity and tube to tube inner diameter variance, as well as the already described spacing variance issue, are significant manufacturing deficiencies to the point where they might actually contend that the single tube extrusion process is more desirable. Those whom would argue as such have no where near the level of experience and skill of this inventor in designing and running extrusion systems for such designs, and in all probability do not further understand the significant long term consequences of the effect of the relevant process induced intermolecular order within the damaging environmental elements of the intended application. In practice, extruder line speeds on polypropylene based absorber designs with much more complex design elements than what is relevant to the disclosure of this invention are attainable in excess of 30 ft/min. and 350 pounds per hour on a 3½ inch extruder with outstanding dimensional control. The other relevant factors including the round tube shape, the cost effective thickness, the lack of need for any additional tube positioning components, and the great multiplicity of undulating mechanical locking points are too obvious to further expound upon. All these things now considered the magnitude of the extent to which the preferred extruded absorber embodiments are so very highly leveraged as relating to manufacturability and application use can be better appreciated.

It should immediately be noted that in any polymeric injection molding process the quality of the molded structure is to some degree influenced by the direction of molten polymer flow, the geometric complexity of the structure, and the effectiveness in which air and polymeric decomposition gas is displaced by the molten polymer within the mold cavity. In hermetic over molding processes wherein molten polymer is being pressed and fused onto the surface of a pre-made polymeric substrate to obtain a highly durable leak resistant enjoinment, effective displacement of air and thermally induced gas is of exceedingly greater difficulty and concern. The hermetic integrity of the enjoined interface is disrupted to the extent to which air/gas displacement is impeded. This dynamic is greatly complicated when a structure is being formed and solidified over a pre-made substrate that has an undulated surface, particularly so when that undulated surface is oriented in a direction that is perpendicular to the injection flow direction, and even more particularly so when the formed and solidified structure is an elongated hollow structure having its elongated direction perpendicular to the forming direction of the pre-made undulating substrate.

Accordingly, it is an especially unique challenge to not only significantly enhance the effectual displacement of air and thermally induced gas but to also impede the formation of thermally induced gas. It is also very desirable to maximize the area of enjoinment and to enhance the fusibility of the formed manifold to extruded substrate surface. It is an object of this invention to accomplish these aims and to do it in a very cost effective manner.

Accordingly, the mold forming of elongated hollow structures are the common form of solar collector manifolds and require the elongated mold core structure to hold firm opposite the directional filling pressure within the mold. Any deflection will cause a manifold thickness eccentricity that will impart manifold warp which progressively increases with increasing eccentricity. This is exacerbated when the manifold is formed of a material that is regarded as a crystalline polymer. Crystallization variances from one region of the mold part to another are another one of those process induced intermolecular order limitations. It is a very significant concern with the preferred material for constructing polymeric solar collectors, polypropylene. The inventor has determined that the ongoing repeatability of the process and integrity of the product is best served when the manifold mold core (520) of FIG. 10 is securely locked and centered within the manifold mold cavity as defined by the clamping of the upper mold cavity (530) onto the lower mold cavity (540). The manifold mold core span between these locked ends imposes further restrictions that are dependent upon the chosen directional filling strategy. If one chooses to fill the mold perpendicular to the elongated mold core, going beyond a one foot span between the fixed manifold mold core (520) ends will result in unacceptable mold core deflection. Being contained by this restraint such a fill strategy requires 6 down line welds of the manifold ends to build the solar collector out to the desired 4 foot width. It is the inventor's opinion that this limitation grossly under leverages the utility of the over molding operation. If one chooses to fill the mold parallel to the elongated direction of the manifold mold core (520), zero deflection of the manifold mold core is attained between the fixed core ends. However, when further extending the span between the fixed manifold mold core (520) ends one encounters the limitation of mold filling as regarding flow path length relative to the annular flow gap thickness (440). The further requirement of making a durable hermetic enjoinment of the formed manifold to the totality of the interfacial absorber surface exacerbates the effect of this restraining influence. The inventor has found that the practically attainable flow path length to annular mold cavity gap limitation effectively limits the optimum mold core span length to 2 feet, thus requiring 2 downstream welds per solar collector. The inventor has also determined that injecting from both ends to keep within the 2 foot flow length constraint results in unacceptable manifold strength where the opposing melt flow fronts meet in the center. The inventor has further determined that it is impractical to design a 4 foot span between the fixed mold core ends in the first place due to a doubling of the manifold thickness differential from one end to the other relative the minimum amount of core draft that is required to pull the core from the formed and solidified manifold. The remaining strategy to make a 4 foot wide molded manifold is to pull the cores from both ends leaving an unfixed center and go to a modified multi-gated filling strategy wherein the mold is filled though from matched pairs gates from opposing manifold sides. The inventor has determined that the resultant manifold mold core (520) deflection and consequent manifold warp from such a strategy is again unacceptable, rendering the attempted strategy to be grossly over leveraged. The inventor has further found that it is desirable to over mold the two center welds of the preferential leveraged process option to strengthen those welds. It can thus be seen that the aim here is to obtain an optimum overall balance between the conflicting restraints to obtain the optimum leverage of the over molding process, and to further systematically leverage all available polymeric manufacturing technology to obtain the optimum final product.

FIG. 8 illustrates a segment of the unitarily removable molding apparatus of this invention. It is preferably made as a tack welded assembly of an elongated bar having spaced openings of which a portion is shown in FIG. 9A and a great plurality of pin projections as individually shown in FIG. 9B. The vent cuts (96) are preferably oriented to be aligned with the coplanar centerline spacing of the bar as shown. The more thinned and elongated segment of the vent cut (96) preferably provides a 0.0001 square inch minimum to a 0.0005 square inch maximum passageway as it interfaces with the straight opening (115) of FIG. 9A. The vent cut (96) in the conical head (91) of the pin projection (90) can have a more enlarged opening as shown in FIG. 9B. TIG tack welds are preferably made at the 12 o'clock and 6 o'clock positions when viewing the apparatus as facing the second surface (120). In use the bar will flex in the elongated direction and tend to crack tack welds placed in other locations around the end closest the circumference of the pin projection conical head (91). This overall construction strategy facilitates initial manufacturability and continuing upkeep of the apparatus.

FIG. 8 also shows individual detail of the spaced openings. These spaced openings are shown in the preferred round embodiment. As is shown in FIG. 9A-1, these spaced openings are comprised of three compartments. Hollow pocket (111) descends from a first surface (110). All such hollow pockets are preferably tapered to decrease in diameter as moving in a direction from the first surface (110). This is to alleviate unnecessary added resistance when extracting the unitarily removable molding apparatus (100) at the end of each production cycle for repeated reuse. Conical pocket (121) descends from a second surface (120). These conical pockets precisely match the conical head (91) of the pin projections (90). They position the pin projection (90) as inserted into the elongated bar (101) in a direction from the second surface (120) toward the first surface (110). Sandwiched between conical pocket (121) and hollow pocket (111) is a straight opening (115) that precisely matches the diameter and length of pin projection segment (92). The combined effect here is to shut off the over molding cavity at the descended base of the hollow pocket (111) from molten plastic flow. As seen in FIG. 9B there is a vent cut (96) that runs through pin projection segment (92) and conical pin projection head (91) to communicate with elongated vent channel (122) as shown in FIG. 8. As also shown in FIG. 8, pin projection pocket core segment (93) coordinates with hollow pocket (111) to form an annular open space. Pin projection pocket core segment (93) is preferably tapered to increase in diameter as moving in a direction from the first surface (110) toward the second surface (120). As is with the case with hollow pocket (111), this is intended to further alleviate unnecessary added resistance when extracting the unitarily removable molding apparatus (100) at the end of each production cycle for repeated reuse. A pin projection abrupt step (94), a pin projection absorber tube support segment (95), and a pin projection rounded nose (96) are further shown in FIG. 9B and FIG. 8.

As regarding the earlier disclosure as relating to the undulating connected tube absorber extrusion surface substrate over molded with a hollow elongated manifold wherein the injection flow is perpendicular to the extrusion direction and parallel to the elongated manifold core, the novel apparatus (100) of this invention provides a particular benefit to the effective polymeric displacement of air and gas within the mold cavity. Its design and use functionality in this regard is multifaceted. Firstly, FIG. 10 shows a recessed positioning of the polymer wetted first surface (110) of the removable absorber tube supporting apparatus (100) as positioned within the manifold mold core slot (520). This positioning recess creates a thickened flow gap (420) as related to the thickness of the base manifold wall (440). For sake of simplification, the open cavity area is tagged so that it can be either applicable to the pre-injected stage of the over mold assembly or the post injection stage of the over mold assembly. The gap defining the elongated inner tab (420) fully extends from one end of the manifold to the other. A mold cavity gap (410) that envelopes the entire outer surface around the inserted absorber immediately outside the confines of the manifold wall gap (440) forms an external elongated over molded socket (410). The combined expanded gap of the mold cavity opening in this elongated segment creates a flow leader wherein the annular melt front of the injected molten polymer upon high speed first stage injection filling advances in a more diagonal than flat advancing manner to more effectively push air and gas through a bank of mold cavity vents (560) located along the entire manifold side directly opposite the inserted absorber conduit centerline on the mold cavity parting line (550) where the mold cavity moving half (530) and the mold cavity stationary half (540) close. In accomplishing this it further over comes what would otherwise be a wholly dysfunctional lagging fill rate in this same area due to the undulating effect of the inserted absorber contour on the preferred end of fill injection. It is most preferable to exhaust the majority of air and gas anywhere than at the absorber (300)/shut off rails (535) and (545) interface, which is the traditionally favored air/gas release strategy for those of ordinary skill in the art. This is most especially so when the more traditional multi-port backside injection strategy is employed. Accordingly, all metal interfaces as opposed to the plastic/metal interface at absorber (300)/shut off rail (530) and 545) interfaces is much more controllable. FIG. 10 shows pin projection (90) with venting cut (96) where air and gas pushed into an open cavity (430) as defined between hollow pocket (111) and pin segment (93) is passed through the inventive apparatus (100) to be discharged through an elongated hollow channel (122) running along the backside (120) of the apparatus (100) that is further defined by the confines of the mold core slot (520). A vacuum assist can easily be added to more aggressively withdraw air and gas through this elongated channel (122) and the venting cuts (96) and away from the closely adjacent critical interfacial bonding area, preferably during the first stage injection filling of the mold cavity. This critical interfacial bonding area is more specifically defined as comprising the cavity gap (420), (440), and (410) in order of proximity. Some mold air is likewise exhausted between the upper mold cavity shut off rail (535) and the absorber (300) upper outer surface and the lower mold cavity shut off rail (545) and the absorber (300) lower outer surface. It is preferable to keep these interfacial shut off contact areas as tight as possible to eliminate flashing the mold. This enables the temperature and pressure of the mold filling and packing to be maximized for the very best manifold to absorber surface enjoinment without blowing flash through the mold cavity shut off rails (535) and (545) that seal off the mold cavity around the absorber (300). This would result in a very undesirable product appearance, and most importantly would greatly compromise the part to part hermetic enjoinment consistency, and with it processing efficiency and final product durability.

Preferably, the first stage mold fill is screw position limited to proportion approximating 90% of final part weight. It is very important to experimentally develop and precisely lock in an optimum first injection stage fill proportion as based upon the specific design of the overall molded manifold. Continued maintenance of this first stage filling relationship to the manufacturing efficiency of the air/gas displacement is a critical process dynamic in the most effective utilization of this invented apparatus. The objective is to flash fill the mold cavity as fast as the venting will allow while in the high speed first injection stage to a mold cavity segment that is slightly beyond the end of the manifold/absorber interface zone to quickly encapsulate the outer absorber surface with predominantly un-cooled molten polymer. Second stage packing injection is pressure and time segmented as determined by in cavity mold pressure monitoring near the injection end. It is preferable to use a multi-step profiling strategy that is capable of modulating packing pressure over definable time segments. Mold cavity pressure monitoring is especially helpful for establishing second stage injection packing profiles.

Those of traditional skill in the art know that polypropylene does not absorb moisture and does not require pre-drying of the material. The process dynamics of solar collector hermetic enjoinment preferably include not only pre-drying, but highly effective pre-drying. The molding material is preferably dried at 180 F to a −40 F dew point to remove all adsorbed surface moisture to the pellet surfaces due to the relatively high fill levels of carbon black traditionally used in the stabilization of polypropylene for solar collector utility. In relation to the subject matter at hand, this limits the contribution of water vapor to the over amount of the air/gas displacement load.

The process is preferably run at melt temperatures exceeding 500 F., preferably using a high shear barrier screw to heat and thin the molten polymer to more effectively press and fuse the molten polymer into every macro and micro surface crevice of the connected tube absorber substrate. The processing temperature is extremely important to the practical use of the invented apparatus. When considering all, with particular emphasis on the concept of all, the interacting factors as disclosed thus far it should be easy to understand how the accumulated spacing variance coping design of the connected tube absorber structure of FIG. 3 and FIG. 5 are so overwhelmingly inferior to those shown in FIG. 1 and FIG. 2A relative to packing out the outer contour crevices.

In another beneficial aspect of the invention the apparatus is particularly useful for enhancing the strength and inherent integrity of hermetically enjoined manifold to absorber connections in general, and with connected tube absorber constructions in particular. Again FIG. 10 shows a cross sectional view of the manifold/absorber enjoinment. As can be readily seen as the preferred embodiment, there is a distinct construction separation between the outer portion housing the absorber and the inner portion beyond where the absorber is discontinued. This separation occurs within the mass of the elongated inner manifold tab (420). The absorber (300) is fused to the collective surrounding masses of the outer socket (410), the manifold wall (440), and a portion of the inner elongated tab (420). This combined outer portion of the manifold is fused to the upper and lower absorber surfaces over a range of width that greatly exceeds the manifold wall. This greatly broadens the interfacial contact area as between the manifold and the absorber surfaces, promoting greater interfacial bond overall strength and a much longer required failure path for potential leaks. There remains an inner portion of the manifold equal to the combined width of the inlet/outlet port (430) and that portion of the inner manifold tab (420) that is not in contact with the absorber surface. Within this inner combined width the melt is wholly fused within itself thus providing a hoop stress reinforcement element at the inner portion of the manifold to further support the enduring integrity of the hermetic enjoinment. It cannot be overlooked that the combination of all the design elements must be insightfully balanced so as to not impart an unwanted thickness problem the absorber side of the manifold along with the very complex intermolecular order aspects from process induced crystallization non-uniformity and the additional part cooling headaches that come with it.

In yet another beneficial aspect of the invention no part of the absorber breaks in to the internal wetted surface of the formed manifold except at the abutted face of the inlet/outlet port (430). The abrupt step (94) as shown most clearly on FIG. 10 serves to locate the absorber end face within the mass of the inner manifold tab (420). This affords a unique repair area inside the confines of the inlet/outlet port (430) that all distributed manifold fluid can only pass through before making any contact with the absorber (300). Apart from this inlet/outlet port (430), a leaking tube cannot be plugged within the formed manifold (400) without interference of the absorber (300). Any repair outside of this inlet/outlet port (430) will have the tube portion of the absorber (300) within it. If a seep leak should occur in the interfacial surface between an absorber flow tube and the manifold wall (400), that repair must somehow work through the absorber flow tube wall to seal the leak. Experience has shown that such a repair is temporary at best. The provision to now make this repair within the exclusive confines of the formed manifold renders tube leak repairs of all kinds to be permanent.

The abrupt pin step (94) as shown in Drawing 4 sets the overall foot print length of the fully assembled solar collector. That step is preferably minimized so that a large majority of the flow tube end face is open to over molding coverage wherein the over molding melt not only covers the outer surface of the absorber, it covers the majority of the face of the flow tunes as well.

With connected tube absorber structures there is a warp resistive balance that must be maintained between the manifold side where the absorber enjoins into and the opposing manifold side. Such a pre-made extruded absorber structure impedes the shrinkage on the manifold side it is enjoined to in contrast to the opposite manifold side. To maintain manifold straightness all the cooling, thickness, and crystallization concerns of the mold core deflection issue come back into play. Referring again to FIG. 10 the external manifold socket (410) certainly works toward overcoming the shrinkage differential as imposed by the absorber insertion. The inner manifold tab (420) further works toward overcoming this differential. Both combined are still not enough. The inner manifold tab (420) could be further thickened at the expense of the inlet/outlet port (430), but this both impedes the repair benefit and begins to put an excessive amount of thickness relative to cooling concerns. All things considered the most leveraged approach is to blend 15% by weight of short glass fiber into the molding formulation along with a maleic anhydride coupling agent. The preferred single end injection strategy of the invention coordinates perfectly with the fiber glass as the glass particles parallel to the flow direction which is straight down the manifold length. Post mold shrinkage down the approximate 2 foot length is only approximately one millimeter with the cut glass fibers having an aspect ratio of 200 to 1. The consequence of making the overall magnitude of the overall shrinkage so small to begin with, makes fine tuning the side to side shrinkage differential to achieve perfect manifold straightness very easy. The effect of the fiber glass being well oriented down the length of the manifold cuts roof top manifold length shrinkage in half. This is significant benefit when 6, 7, or 8 four foot long manifolds are connected end to end, where by common overall installed bank length change is reduced from 3" to 1/1;2". Furthermore, the glass fiber fill enables the formed manifolds to be removed from the mold at a higher temperature deformation more which increases the overall cycle pace and ease of processing in both molding and all the down line finishing processes. In total the significant reduction of how much the installed strings of manifolds walk on the roof, the ability to work with dead straight manifolds in downstream finishing operations and installations, the far superior installation aesthetics, the various manufacturing benefits, and most importantly the very much less built in manifold stress from a much lesser shrinking formed manifold locking onto a pre-made already shrunk post extrusion absorber substrate which far exceeds any relatively very small temperature induced stress from the presence of glass fiber in the manifold and not in the absorber. All one has to do is look at the excessive amount of warp in a non-glass filled manifold that has been over molded over a connectively spaced tube absorber substrate to appreciate this fact.

To impede unnecessarily excessive material decomposition gas to the air/gas displacement load that is to be displaced in using the molding apparatus of the invention, it is preferable that at least 1000 ppm of 1,3,5-trimethyl-2,4,6-tris(3,5-di-tert-4-hydroxybenzel)benzene be included in the formulation to more effectively stabilize the over molding process. The over molding process is ideally run at a polymer melt temperature at or exceeding 500 F using a high shear barrier flighted screw to most effectively fill and fuse to the extrusion processed substrate. Although this preferred process environment is not excessive relative to what is regarded as acceptable, it is more aggressive than what is regarded as customary. This functionally consumable free radical scavenging additive offers very strong melt process stabilization and is also a very effective long term use antioxidant that is particular suited as a consumable functioning synergist in the overall long term use stabilization package for water heating solar collectors in that it offers very low hot water extractability in addition to its more active melt processing benefit as compared to the alternatives of its primary stabilizer type. The pin projection (90) passageways as formed at the interface of the projection segment (92) with the straight opening (115) by means of the vent cut (96) as specified is sufficiently sized to occasionally clean ongoing accumulation of condensing polymeric decomposition gas using a 0.005" diameter wire.

In that the end use of solar collectors for heating swimming pools are known to be enhanced through the addition of stabilizer additives that otherwise in no way contribute to enhancing the over molding process using the apparatus of this invention, it is preferable that those end use only enhancing additives are selected relative to a minimal contribution of decomposition gas when using the preferred methods of this invention. It is not prudent to undo all the care that goes into a superior process by thoughtlessly introducing end use additives that behave in ways that undermine the process.

To further enhance thermally fused enjoinment of the interfacial bond between the over molded manifold and the pre-extruded substrate, it is preferable to include a 3% to 6% weight proportionality of Dow Versify 2300 to both the over molding material and the extrusion substrate material. It is believed that the uniquely broad crystalline distribution of Versify is responsible for this behavior. This attribute provides for a very broad melting range that is particularly useful for thermal fusion sealing. This is most effectively accomplished in the overall manufacturing operation by using it as a carrier in the carbon black master batch. The addition of large amounts of carbon black is necessary in solar collectors for heating swimming pools for both heating performance and UV protection of the polypropylene polymer. The addition of carbon black is best accomplished with very high shear melt mixing within a carrier that is preferably very highly compatible with polypropylene and provides high filler acceptance. Dow Versify 2300 has a very favorable MFI for such mixing, and further has a very low flexural modulus that overwhelmingly more than reverses the stiffening effect of the carbon black filler, it further enhances the overall material toughness. Even more, it is virtually gel free, unlike traditional master batch carrier alternatives, which is especially beneficial for relatively thin walled absorber constructions. Dow Versify 2300 provides very highly leveraged utility to the overall application when used in this fashion.

To even further enhance thermally fused enjoinment of the interfacial bond between the over molded manifold and the pre-extruded substrate, it is preferable a very clean pre-extruded substrate interfacial surface to the over molding process of this invention. With such substrates surface components that not only may be considered contaminants but actual additives within the polymeric mass depending on what they are can migrate out of the polymeric mass to the surface and like a contaminant interfere would the quality of the overall hermetic enjoinment. In that polypropylene in particular continues to alter in intermolecular order in a molecularly compacting manner, such migrated additive components from the polymeric mass is of special significance. It is particularly preferable to provide a very clean pre-extruded surface to the over molding process when presenting the preferred connectively spaced extrusion substrates of the invention. Like air, water vapor, and polymer and additive decomposition gas, contaminants like dust, grease, and other air borne contaminants, and post-extrusion migrated additive components that are unfriendly with interfacial bonding will tend to push and gather into the inherent exterior surface crevices of the preferred connectively spaced extruded substrate during injection filling. They can also eventually block the preferred metallic mold venting passages over repeated cycling to inhibit the release of air and gas from the filling mold cavity. A very effective means for mitigating this is to subject the exterior interfacial surface to atmospheric plasma. This very effectively removes virtually all presence of any of the interfacial bond inhibiting components of concern and comprise a very valuable utility to the continuing repeated use of the apparatus of this invention.

It has been discovered through the ongoing repeating use of a precursor apparatus used prior to the full development of this invention that conventional tool steel is inadequate for very long term repeated use. The problem lies in the fatigue flex crack resistance traceable to the relatively high carbon content of such steels. As conventional tool steels go H13 is the best, but not enough for this. H13 also is not as good from a weld ability perspective as steels go. The consequence of this is that broken bars (101), sheered absorber tube supporting pins (90), and broken absorber tube support pin mounting welds are a common reoccurring problem using H13 for the apparatus. The problem is brought out by a repetitious combination of 500 F plus polymer melt forming upon and within, followed by the amount of flexing involved with extracting the inventive apparatus from the cooled formed manifold and absorber, followed by an impactively applied absorber tube insertion means. All the damage is repairable through added welding, but the added welding works to progressively further harm the inner structure of the steel resulting more and more frequent crack formation and breakage. Accordingly the preferred material of construction is VascoMax C-250. Properly treated it has in addition to superior weld ability, more than an order of magnitude less of not only carbon, but also all the other key structural elements within H13. It provides a modulus of elasticity that is within 10% of H13, a coefficient of thermal expansion at 20% less than H13, a thermal conductivity running 40% greater than H13. It is a material that is not at all commonly used in plastic mold making, but is used in die casting and in that field it is more impact and crack propagation resistant and yields a 10 fold improvement in die life vs. H13.

As to a further description of the manner and use of the present invention, the same should be apparent from the above description. Accordingly, no further discussion relating to the manner of usage and operation will be provided.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A unitarily removable molding apparatus having at least four elongated surfaces, the molding apparatus comprising:
   a first elongated surface separated from a second elongated surface;
   a plurality of coplanar aligned and spaced hollow pockets descended from said first elongated surface to a descended surface shorter in depth than said separated thickness from said first elongated surface to said second elongated surface;
   a plurality of coplanar aligned and spaced projections extending beyond said first surface from or preferably through said descended surface of said hollow pockets, wherein each said projection has a common center with one said hollow pocket, and wherein at least one passage is provided between each said descended surface of said hollow pockets to an elongated passage within or upon said second elongated surface; and
   a third elongated surface separated from a fourth elongated surface,
   wherein said elongated second surface contains a plurality of coplanar aligned and spaced conically shaped tapered openings, said conically shaped tapered openings decreasing in diameter in a direction as moving from said elongated second surface to a position short of said descended hollow pocket surface, wherein a center of said conically shaped openings aligns with a center of said hollow pockets, and wherein each said projection has a conical end segment matching a tapered angle of each said conically shaped tapered openings ending at said position short of said descending hollow pocket surface, wherein each said projection has a segment of constant diameter from said position short of said descended hollow pocket surface to said descended hollow pocket surface, closely matching an opening extending from said position short of said descended hollow pocket surface to said descended hollow pocket surface, wherein each said projection contains a passage extending through said conical end segment and said segment of constant diameter, each said conical end of said projection is wholly recessed within said second elongated surface, and each said conical end of said projection is secured with TIG weld tacks.

2. The unitarily removable molding apparatus of claim 1, wherein the said first elongated surface is separated from the said second elongated surface by a progressively thinning thickness toward a mold injection end, and wherein the said third elongated surface is separated from the said fourth elongated surface by a progressively thinning thickness toward a mold injection end.

3. The unitarily removable molding apparatus of claim 1, wherein at least one of said spaced projections have an abruptly stepped size reduction at a common distance beyond said first elongated surface and wherein said projections and said hollow pockets may be essentially square, rectangular, oval, or round-shaped.

4. The unitarily removable molding apparatus of claim 3, wherein the spaced projection having said round-shaped have a decreasing diametrical taper ranging from 2% to 5% from said abrupt step extending to or close to a terminal end that is formed to a full radius nose.

5. The unitarily removable molding apparatus of claim 4, further comprising:
 a subassembly comprising a multi-conduit fluid passage wherein the said projections are unitarily inserted into first ends of an extrusion component or components comprising an equal number of similarly shaped and spaced hollow conduits; and
 a second unitarily removable molding apparatus having projections into second ends of said extrusion component or components comprising an equal number of similarly shaped and spaced hollow conduits, wherein the limit of said unitary insertion is an abrupt step of the projections, wherein the external diametrical size of the said projections immediately below the said abrupt step is within a range of 1% to 6% greater than an internal diametric size of the said similarly shaped and spaced hollow conduits.

6. The multi-conduit fluid passage of claim 5, wherein said multi-conduit fluid passage is a connected assembly of a plurality of single piece extrusion constructions, wherein the said single piece constructions are comprised of spaced tubes connected one to another with connective elements that are within or extended beyond the upper and lower diametric bounds of a plurality of similar diameter tubes, wherein the said spaced tubes are aligned with a common horizontal center line, wherein at each end of said aligned plurality of spaced tubes comprising a said single piece extrusion is a connecting to assemble a plurality of single piece extrusions together in a likewise coplanar aligned manner.

7. The unitarily removable molding apparatus of claim 1, wherein the unitarily removable molding apparatus is formed of VascoMax C-250.

8. The unitarily removable mold tool of claim 1, wherein said hollow pockets are tapered in a direction from said first surface to said descended surface of said hollow pockets, and wherein said spaced projections are tapered in a direction from said first surface to said descended surface of said hollow pockets.

* * * * *